United States Patent [19]

Lurie et al.

[11] Patent Number: 4,932,270
[45] Date of Patent: Jun. 12, 1990

[54] TORQUE SENSOR HAVING A SPOKED SENSOR ELEMENT SUPPORT STRUCTURE

[75] Inventors: Boris J. Lurie, La Crescenta; J. Alan Schier, Tujunga; Michael M. Socha, La Crescenta, all of Calif.

[73] Assignee: The United States of America as represented by the Administrator of the National Aeronautics and Space Administration, Washington, D.C.

[21] Appl. No.: 326,820

[22] Filed: Mar. 21, 1989

[51] Int. Cl.⁵ ............................................. G01L 3/00
[52] U.S. Cl. .............................. 73/862.33; 73/862.36
[58] Field of Search ........... 73/862.08, 862.04, 862.36, 73/862.33, 862.68, DIG. 4; 464/82, 100

[56] References Cited

U.S. PATENT DOCUMENTS

| | | | |
|---|---|---|---|
| 2,049,330 | 7/1936 | Smith, Jr. | 73/862.36 |
| 2,054,787 | 9/1936 | Beavers et al. | 73/DIG. 4 |
| 3,427,875 | 2/1969 | Saxl . | |
| 3,481,192 | 12/1969 | Herzog et al. . | |
| 3,613,457 | 10/1971 | Paine . | |
| 3,771,359 | 11/1973 | Shoberg | 73/862.04 |
| 3,832,896 | 9/1974 | Lonnroth | 73/862.33 |
| 3,956,930 | 5/1976 | Shoberg . | |
| 4,088,916 | 5/1978 | Weineck et al. | 310/338 |
| 4,186,596 | 2/1980 | Bohringer et al. . | |
| 4,327,593 | 5/1982 | Porat | 73/862.68 |
| 4,471,663 | 9/1984 | Wallace . | |
| 4,640,138 | 2/1987 | Meyer et al. . | |
| 4,706,505 | 11/1987 | King . | |

FOREIGN PATENT DOCUMENTS 309259  9/1971  U.S.S.R. .

*Primary Examiner*—Charles A. Ruehl
*Attorney, Agent, or Firm*—Thomas H. Jones; John R. Manning; Charles E. B. Glenn

[57] ABSTRACT

Piezoelectric sensor devices are attached across pairs of circularly arranged spokes arrayed on the periphery of an annular ring. The sensor devices each include a preloaded steel ball mounting arrangement for mounting a piezoelectric sensor element. A first circular interface plate on one side of the sensor structure attaches to alternate ones of the spokes, and a circular interface plate on the opposite side of the same diameter as the first interface plate attaches to the remaining spokes.

13 Claims, 4 Drawing Sheets

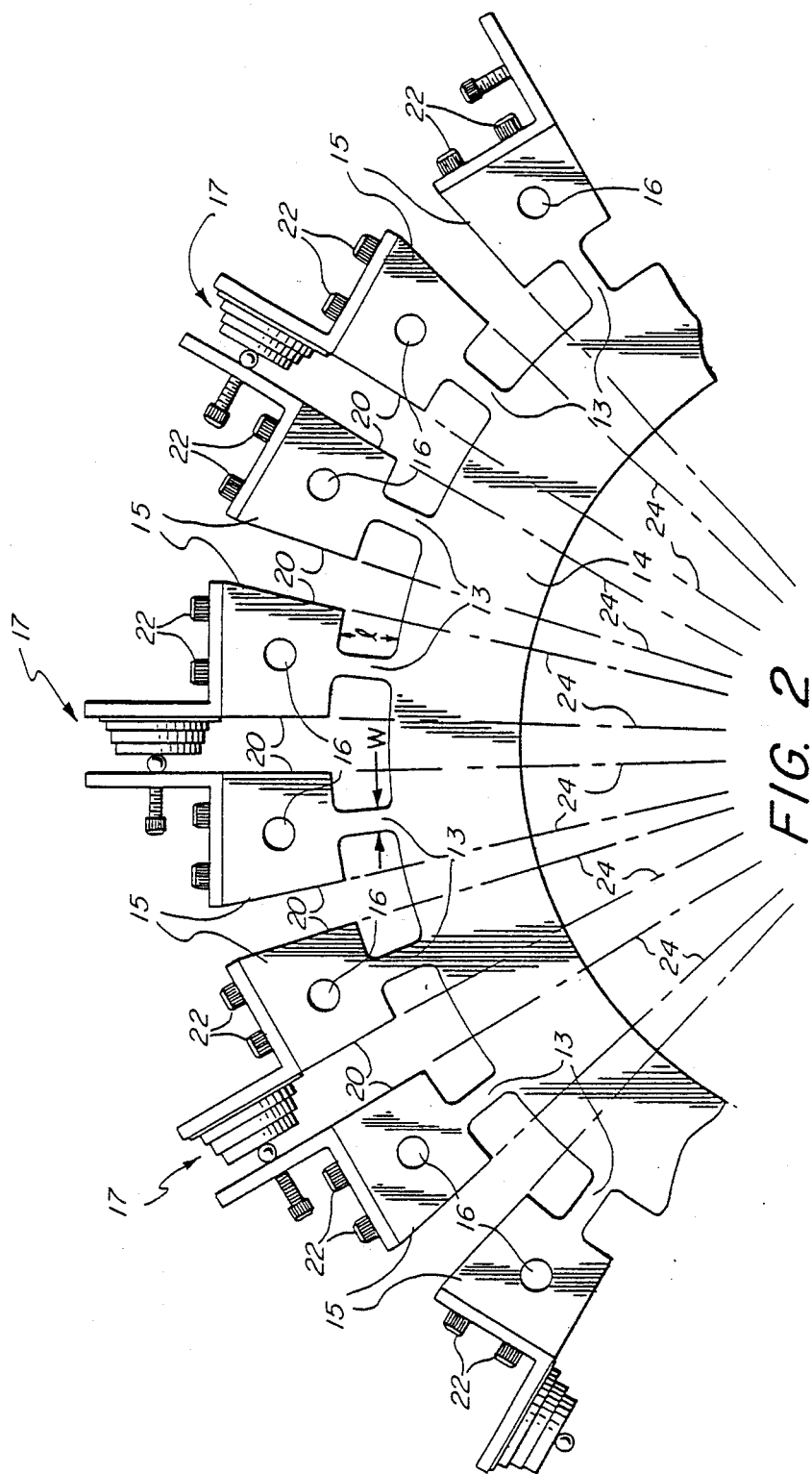

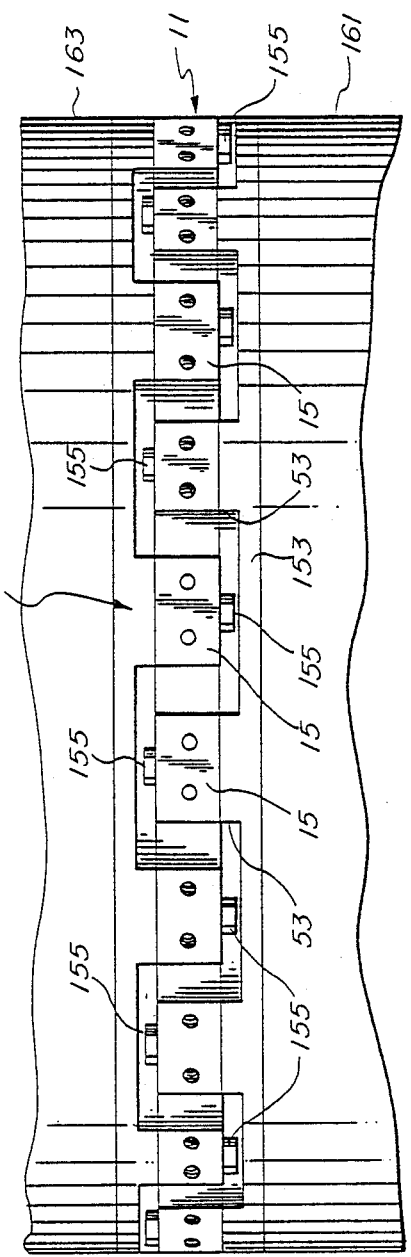

TORQUE SENSOR HAVING A SPOKED SENSOR ELEMENT SUPPORT STRUCTURE

ORIGIN OF THE INVENTION

The invention described herein was made in the performance of work under a NASA contract, and is subject the provisions of Public Law 96-517 (35 USC 202) in which the Contractor has elected not to retain title.

TECHNICAL FIELD

The subject invention relates to sensors/transducers and, more particularly, to a torque sensor featuring improved cross-axis stiffness and isolation of cross-axis perturbations, and useful in space-based precision pointing applications.

BACKGROUND ART

The accuracy of precision pointing systems is often diminished by the inevitable presence of nonlinear drag torques resulting from rolling bearing friction and power/signal transfer cabling across rotary joints. These torques are difficult to characterize and impossible to predict analytically. Therefore, the preferred approach is to sense the torques to provide torque knowledge that can be utilized by a controls designer to compensate for the nonlinearities.

Sensing torque directly in the precision motion control of spacecraft science platforms is recognized as a sound approach to significantly improving pointing performance. However, previous torque-sensor designs are unacceptable for spacecraft science-platform articulation control because the resulting devices are too flexible and of low resolution and low bandwidth. Typical prior art designs utilize displacement sensors configured on a flexible structure. Most designs use strain gauges as the sensing element, which requires rather flexible structures to obtain usable output signals. Other sensing elements also suffer from flexibility and dynamic range limitations, or would require equipment too large or too complex to be incorporated practically.

STATEMENT OF THE INVENTION

It is therefore an object of the invention to improve torque sensors;

It is another object of the invention to provide a torque sensor with improved resolution and bandwidth; and It is another object of the invention to provide a torque sensor featuring increased stiffness and dynamic range and particularly suited for space-based precision pointing systems.

These and other objects are achieved according to the invention by provision of a circular central sensor support structure featuring circumferentially arranged corrugations, which create a number of spokes. A torque sensor device is mounted across at least one pair of the spokes. Interface plates are mounted above and below the sensor support structure and attached to alternate spokes to facilitate mounting of the support structure and movement of the spokes. The corrugated support structure provides both rotational compliance and cross-axis stiffness.

BRIEF DESCRIPTION OF THE DRAWINGS

The just-summarized invention will now be described in more detail in conjunction with the drawings of which:

FIG. 2 is a top view of a section of the embodiment of FIG. 1;

FIG. 6 is a side view of an application of the preferred embodiment.

DETAILED DESCRIPTION OF THE INVENTION

Figure 1:
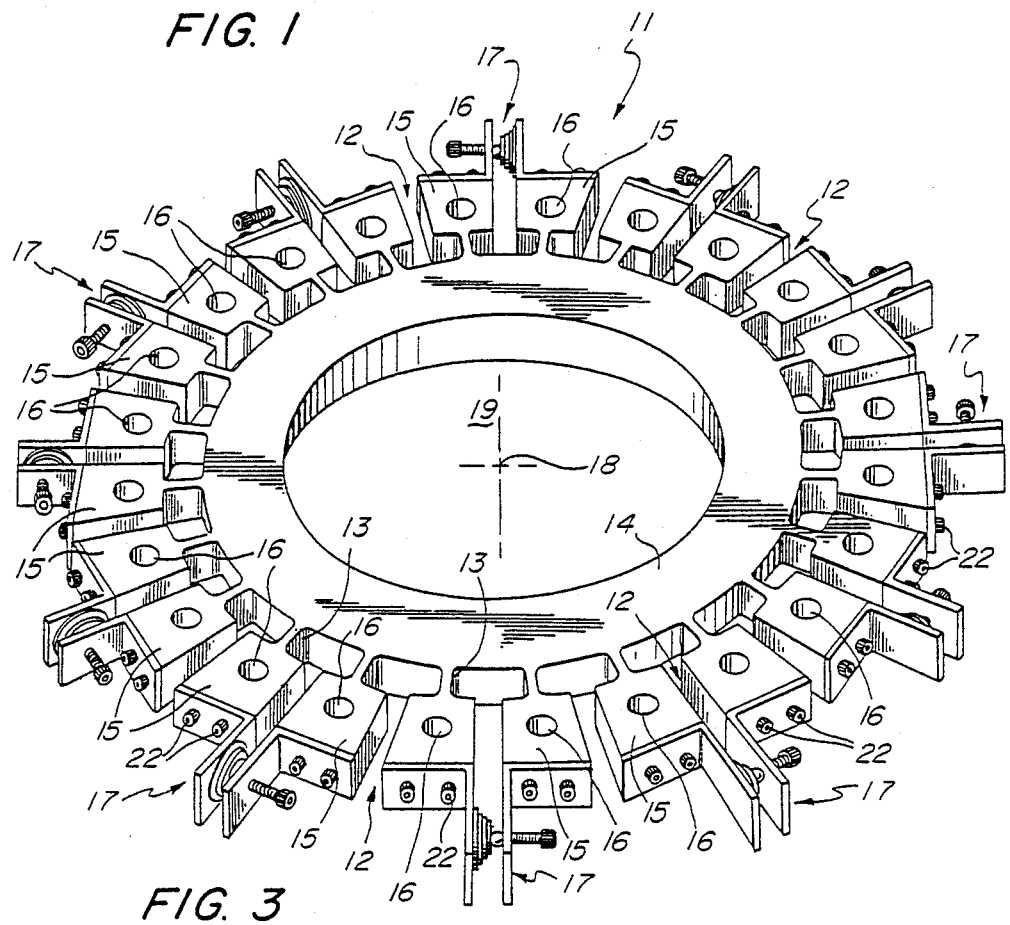
FIG. 1 is a perspective of a support structure with sensing devices mounted thereon according to the preferred embodiment.

FIG. 1 illustrates a circular sensor support structure 11 having a number of corrugations 12, defining spokes 13, extending from an annular ring 14. The corrugations 12 illustrated in FIG. 1 are substantially "T"-shaped in cross-section. It may be noted that other cross-sections for the corrugations 12 may prove optimal in various applications.

Each spoke 13 expands into a sensor mounting pad 15. A sensor device 17 is mounted across each adjacent pair of spokes 13 by attachment to adjacent mounting pads 15 by, e.g., bolts 22. Each pad 15 includes a through hole 16 for a bolt for mounting an interface plate 51 (FIG. 3) as later described. As shown in FIG. 2, the sides 20 of the pads 15 lie on radial lines 24.

The use of multiple sensor devices 17 positioned symmetrically around the support structure 11 increases system stiffness and mechanical symmetry and provides redundancy. Only one sensor device 17 is needed to provide torque knowledge, so in the event of a failure, any of the other sensor devices 17 could be activated. The sensor device 17 senses torque in the plane of the circular support structure 11 about its center 18.

A working prototype sensor support structure 11 has been machined from a single piece of 1.9-centimeter (cm) thick, 6061 T aluminum plate. A 15-cm-diameter hole 19 is located at the center of the aluminum plate, forming the ring 14. The hole 19 lightens the component 11 and, if necessary, allows passage of power and signal transfer cables through it. In the prototype embodiment, the thickness "w" of the narrow portion of the spokes 13, shown in FIG. 2, measure 2 millimeters (mm) thick and is approximately 2.0 cm in height. The portion of thickness "w" extends for a length "l" of 18 mm from the ring 14. The bolt holes 16 in the pads 15 have centers lying on a circle 30 cm in diameter. The flat spoke design provides a large aspect ratio to minimize deflection across the axis of rotation, and yet allows deflection about the rotation axis.

In designing the structure 11, the goal is to make the dimension "w" of the spokes 13 as thin as possible to maximize deflection in rotation and yet wide enough to resist moments across the axis of rotation. Maximum flexibility in rotation is needed to sense extremely small forces. This design goal may be accomplished by analyzing the spokes 13 as simple cantilever beams with a very high aspect ratio to determine the optimum dimensions.

Figure 3:
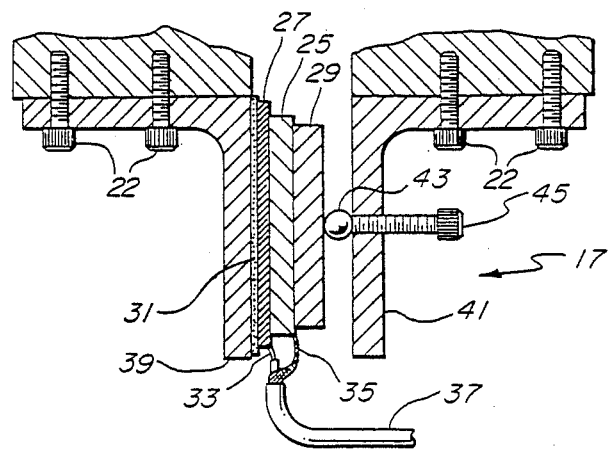
FIG. 3 is a side sectional view of a sensor device according to the preferred embodiment.

The sensor device or "load cell" 17 according to the preferred embodiment is shown in FIG. 3. The sensor device 17 includes a piezoelectric sensor element 25 mounted on a brass base plate 27. The brass plate 27 and sensor element 25 are mounted between a copper disk 29 and a mica insulator 31. First and second leads 33, 35 of a coaxial cable 37 are respectively connected to the brass base plate 27 and the sensor element 25. The leads 33, 35 may feed a standard FET amplifier, which is preferably located as close to the sensor 25 as possible.

The sensor device 17 of FIG. 3 is mounted by first and second mounting brackets 39, 41. The first mounting bracket 39 is attached to the mica insulator 31 by compression or, alternatively, by an adhesive such as a suitable epoxy. The second mounting bracket 41 serves to position a steel ball 43 against the copper disk 29. The steel ball 43 is preloaded by a preload screw 45 and normally does not move. The preload is equal to one-half of the maximum stress of the piezoelectric sensor element 25 and may be on the order of 10 pounds.

The sensor element 25 is mounted to the brass base plate 27 to facilitate electrical connection, and the surfaces of the element 25 are silvered for the same reason. Since the electric field is exposed at the surface of the sensor element 25, the mica insulator 31 isolates it from the mounting bracket 39. On the other side, the copper disk 29 picks off the electrical signal and distributes the preload force over a larger area of the sensor element 25. The preload screw 45 removes compliance within the stack and prevents creep in the assembly. The steel ball 43 reduces cross-axis coupling.

Various sensor devices are known, such as linear variable differential transformers (LVDTs), strain gauges and piezoelectric material. To obtain the highest displacement sensitivity, piezoelectric ceramic material is presently preferred for the sensor element 25. The inherent characteristics of this material result in extremely high sensitivity. The property of the piezoelectric material applied in the preferred embodiment is the electric polarization on its surface produced by mechanical strain. Conversely, when a field is applied to piezoelectric material, it changes dimensions in all three axes. The degree to which these dimensions change relative to the applied field is expressed as the "d" constant. This constant is the stress-free ratio of developed strain to applied field.

The preferred piezoelectric material selected for the torque sensor of the preferred embodiment is from the lead-magnesium-ziconate (PZT) family and has a "d" constant of approximately 110 Coulomb/Newtons (C/N). This material provides a usable output signal which can resolve torque to a 0.001 Newtonmeter (Nm) resolution, specified as a design goal by the inventors. The specific sensitivity relates to the extent to which the effects of coulomb friction from bearings, cables, and motor cogging must be reduced. This sensitivity is well within the capabilities of a torque sensor using a piezoelectric element. Based on calculations using the aforementioned "d" constant, Young's modulus of $7.3 \times 10^{-10} N/m^2$, and a 2-mm-thick, $5.07 \times 10^{-4}$ square meter ($m^2$) area element, an output of 3.4 volts would be achieved for 0.001 Nm of torque. The torque sensor also has a large dynamic range that covers the maximum motor torque to the minimal error that must be corrected.

Figure 4:
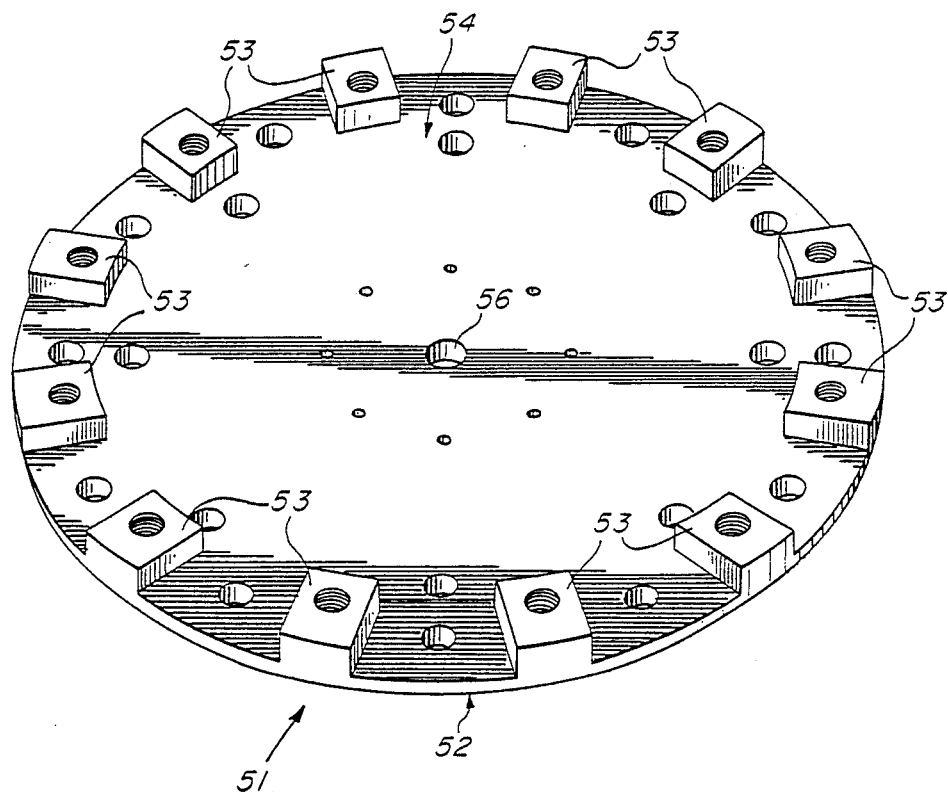
FIG. 4 is a perspective view of an interface plate according the preferred embodiment.

FIG. 4 illustrates a disk-like interface plate 51, a pair of which are used to attach the sensor structure 11 of FIG. 1 to cooperating apparatuses, such as a boom, an antenna, or a science platform. One interface plate 51 comprises a top plate 151 (FIG. 6), and a second interface plate 51 comprises a bottom plate 153 (FIG. 6), which sandwich the sensor structure 11.

Each interface plate 51 may be an aluminum plate of the same outside diameter as the spoked sensor structure 11. A central hole 56 of desired diameter may be provided. The plate 51 is flat on one side 52 but has standoffs 53 machined on the other side 54. The standoffs 53 are positioned to congruently overlie alternating ones of the pads 15 of the spokes 13. As noted, each pad 15 has a through bolt hole 16 for mounting to an interface plate 51.

In space applications, a torque sensor must be rugged, reliable, and capable of withstanding launch vibration. The most sensitive component of the sensor structure 11 is the ceramic sensing element 25, due to its brittle nature. Such brittle ceramic materials must be protected from shear and bending loads.

Figure 5:
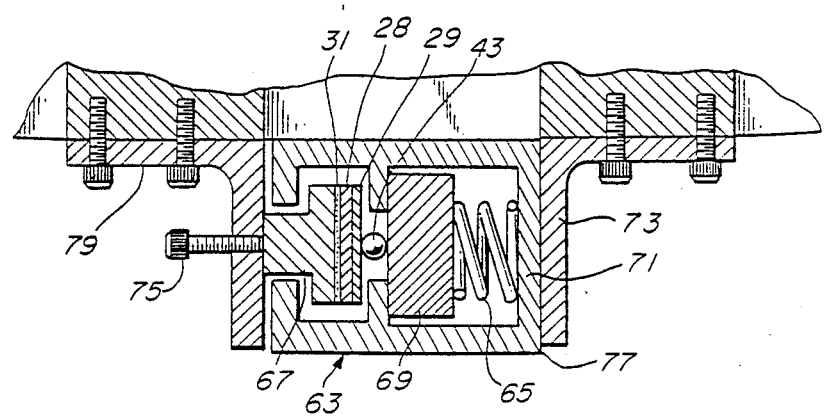
FIG. 5 is a side sectional view of a launch protected sensor device.

The design shown in FIG. 5 shows a launch protection assembly that houses a brittle piezoelectric element 28 so that shear and bending loads are eliminated and the element 28 is subjected only to compressive loads. The assembly of FIG. 5 includes structural elements of FIG. 3 and adds a housing 63, a spring 65, and first and second spacer blocks 67, 69. The sensor element 28 may comprise the sensor element 25 and brass plate 27 of FIG. 3. The mica insulator 31 is attached to the first spacer block 67, while the steel ball 43 interfaces with one side of the second spacer block 69. The spring 65 is mounted between the interior side of the base 71 of the housing 63 and the opposite side of the second spacer block 69. A first mounting bracket 73 is attached to the exterior side 77 of the housing base 71. A second mounting bracket 79 is attached by means of a preload screw 75 to the first spacer block 67.

The assembly of FIG. 5 provides a fixed/floated combination for containing the sensing element 28. The fixed side associated with the first spacer block 67 maintains the axial position of the element 28 and carries part of the load. The other side associated with the second spacer platform 69 is allowed to move axially in the other direction by means of a spring-loaded support. The primary purpose of the spring 65 is to relieve axial loads. The spring 65 also relieves axial strains, such as those due to differentials in temperature or thermal expansion coefficients. The steel ball 4 is used to alleviate loads and motion from the other degrees of freedom by allowing the sensor element 28 to roll when subjected to rotation or translation.

FIG. 6 illustrates the assembled torque sensor comprising the sensor structure 11 sandwiched between an upper interface plate 151 and a lower interface plate 153. Bolts 155 pass through the bolt holes 16 and thread into the interface plates 151, 153 to secure the structure. Mounting consists of attaching alternating spokes 13 via bolts 155 to the standoffs 53 of the top plate 151, and the remaining spokes 13 to the standoffs 53 of the bottom interface plate 153.

One of the interface plates, e.g., 153 serves as an input, receiving a drive from an actuator 161, while the other interface plate 151 serves as the output, transmitting the drive to a payload 163 such as a space platform. The provision of input and output structures having the same relatively large diameter permits maintaining through stiffness according to the preferred embodiment. The resonant frequency of the structure comprising payload and actuator is not reduced by insertion of the torque sensor of the preferred embodiment.

The interface plates 151, 153 themselves serve two useful purposes. The first is to adapt the mechanical interfaces of the mounting structure to the sensor structure 11. The second is to allow connection to alternating spokes 13. If the sensor structure 11 were mounted to a flat interface plate surface, rubbing between the face of the pads 15 and the flat interface plate surface would occur, restricting motion of the spokes 13. Protection against such rubbing is provided by the standoffs 53 on one side of each interface plate 151, 153.

The torque sensor design just described maximizes stiffness in all nonrotational axes. In terms of dynamics, the preferred embodiment provides extremely fine resolution over a wide torque range, possesses wide sensor bandwidth, low signal/noise electrical characteristics, and minimum hysteresis. The preferred embodiment further provides compatibility with a space environment, where it must withstand launch loads, survive radiation exposure, and satisfy electronics qualification requirements. Finally, the preferred embodiment has the low mass and low power consumption desired for space applications, and is relatively inexpensive to manufacture.

Tests indicate that the disclosed steel ball mounting arrangement of the preferred embodiment particularly contributes to a reduction in cross-axis coupling and that, overall, the preferred embodiment can achieve a reduction of cross-axis coupling to about 10% of the rotation axis, presently viewed as an acceptable value for three-dimensional pointing control.

It will be appreciated that variations and modifications in the just-described preferred embodiment may be without departing from the scope and spirit of the invention. Therefore, it is to be understood that, within the scope of the appended claims, the invention may be practiced other than as specifically described herein.

We claim:
1. A torque sensor comprising:
 a metal ring;
 a plurality of spokes extending from said ring having the same thickness as said ring and equally spaced from one another about the circumference of said ring, said spokes terminating in a plurality of said structures of the same thickness as said ring, thereby providing a circular array of pads; and
 at least one sensor means for sensing rotational torque about the center of said ring and attached at one end to a first of said pad structures and at a second end to a second of said pad structures.

2. The torque sensor of claim 1 wherein said at least one sensor means comprises:
 a piezoelectric element; and
 means for mounting said piezoelectric element so as to reduce cross-axis coupling.

3. The torque sensor of claim 2 wherein said piezoelectric element has first and second sides and wherein said sensor device further includes a first conductive layer attached to the first side of said piezoelectric element means.

4. The torque sensor of claim 3 wherein said means for mounting comprises a steel ball for interfacing with said first conductive layer.

5. The torque sensor of claim 4 wherein said sensor device further includes an insulating layer attached to the second side of said piezoelectric element.

6. The torque sensor of claim 2 further including means for applying a preload to said piezoelectric element.

7. A torque sensor comprising:
 a plurality of spoke means;
 means for radially arranging said plurality of spoke means about the circumference of a circle; and
 a torque responsive sensor device connected across at least one pair of said spoke means, said torque sensor device comprising:
 a piezoelectric element; and
 means for mounting said piezoelectric element so as to reduce cross-axis coupling.

8. The torque sensor of claim 7 wherein said piezoelectric element has first and second sides and wherein said sensor device further includes a first conductive layer attached to the first side of said piezoelectric element.

9. The torque sensor of claim 8 wherein said means for mounting comprises a steel ball for interfacing with said first conductive layer.

10. The torque sensor of claim 9 wherein said sensor device further includes an insulating layer attached to the second side of said piezoelectric element.

11. The torque sensor of claim 7 further including means for applying a preload to said piezoelectric element.

12. The torque sensor of claim 7 wherein each said spoke means comprises:
 a spoke element; and
 a pad extending from said spoke element.

13. The torque sensor of claim 12 wherein said means for radially arranging comprises an annular ring.

* * * * *